(12) United States Patent
Alastalo (10) Patent No.: US 6,721,302 B1
(45) Date of Patent: Apr. 13, 2004

(54) APPARATUS, AND ASSOCIATED METHOD, FOR COMMUNICATING PACKET DATA IN A SDMA (SPACE-DIVISION, MULTIPLE-ACCESS) COMMUNICATION SCHEME

(75) Inventor: Ari Alastalo, Helsinki (FI)

(73) Assignee: Nokia Corporation, Espoo (FI)

(*) Notice: Subject to any disclaimer, the term of this patent is extended or adjusted under 35 U.S.C. 154(b) by 621 days.

(21) Appl. No.: 09/715,435

(22) Filed: Nov. 17, 2000

(51) Int. Cl.[7] .................................................. H04J 3/16
(52) U.S. Cl. ........................ 370/346; 370/349; 370/468; 370/471
(58) Field of Search ................................ 370/312, 314, 370/328, 338, 345, 346, 349, 465, 468, 470, 471, 477

(56) References Cited

U.S. PATENT DOCUMENTS

| | | | | |
|---|---|---|---|---|
| 5,384,777 A | * | 1/1995 | Ahmadi et al. | 370/337 |
| 5,642,353 A | * | 6/1997 | Roy et al. | 370/329 |
| 5,644,576 A | * | 7/1997 | Bauchot et al. | 370/437 |
| 6,000,053 A | * | 12/1999 | Levine et al. | 714/766 |
| 6,067,290 A | * | 5/2000 | Paulraj et al. | 370/329 |
| 6,567,387 B1 | * | 5/2003 | Dulin et al. | 370/329 |

OTHER PUBLICATIONS

Xu et al, Global Telecommunications Conference 1994, Throughput Multiplication of Wireless LANs for Multimedia Services: SDMA Protocol Design.*

* cited by examiner

Primary Examiner—Hassan Kizou
Assistant Examiner—Christopher M Swickhamer

(57) ABSTRACT

Apparatus, and an associated method, for facilitating SDMA (Space-Division, Multiple-Access) operation of a packet communication system in which packet data sizes are variable. Determinations are made of at least the relative sizes of data to be communicated pursuant to the separate communication sessions and responsive to such determinations selection is made as to the amounts of data to be communicated within a selected time period, and the time period is selected during which the data is to be communicated.

22 Claims, 4 Drawing Sheets

APPARATUS, AND ASSOCIATED METHOD, FOR COMMUNICATING PACKET DATA IN A SDMA (SPACE-DIVISION, MULTIPLE-ACCESS) COMMUNICATION SCHEME

The present invention relates generally to the communication of data in a packet communication system, such as a WLAN (Wireless Local Area Network), constructed pursuant to the IEEE 802.11 standard. More particularly, the present invention relates to a manner by which to communicate variably-sized data packets pursuant to a SDMA (Space-Division, Multiple-Access) scheme. Communication capacity of the packet communication system is significantly increased through operation of an embodiment of the present invention as communications pursuant to more than one communication session are simultaneously effectuable.

BACKGROUND OF THE INVENTION

A communication system is formed, at a minimum, of a transmitting station and a receiving station interconnected by a communication channel. Communication signals generated by the transmitting station are transmitted upon the communication channel to be received by the receiving station.

A radio communication system is a communication system in which at least a portion of the communication channel is formed of a portion of the electromagnetic spectrum. Increased mobility of communications is permitted as a fixed or hard-wired connection is not required to be formed between the transmitting and receiving stations.

A cellular communication system is an exemplary radio communication system. A subscriber to a cellular communication system, when positioned at almost any location throughout an area encompassed by the network infrastructure of the cellular communication system, is able to communicate by way of the system with a mobile terminal.

The network infrastructure of an exemplary cellular communication system includes spaced-apart, fixed-site base stations which include transceivers. In such an exemplary system, each fixed-site base station defines a cell. As the mobile terminal used by the subscriber to communicate with another communication station travels between cells of the system, uninterrupted communication is possible by handing-over communications from one base station to another.

Several analogous types of wireless communication systems have been implemented, and others have been proposed, to encompass limited areas, such as the area encompassed by a building structure or office workplace. Wireless communication systems sometimes referred to as microcellular networks, private networks, and WLANs (Wireless Local Area Network) are exemplary of such systems.

Wireless communication systems are typically constructed pursuant to standards promulgated by a regulatory or quasi-regulatory body. For instance, the IEEE 802.11 standard, and variants thereof, promulgated by the IEEE (Institute of Electrical and Electronic Engineering) is a wireless LAN standard pertaining generally to communications at various wireless frequencies including a 5 GHz range and a 2.4 GHz range. The 802.11 standard specifies an over-the-air interface between a wireless client, e.g, a mobile terminal, and a base station or access point, as well as among wireless clients. Standards pertaining to a physical layer and a MAC (Media Access Control) layer are set forth in such standard. The standard permits automatic medium sharing between different devices which includes compatible physical layers. Asynchronous data transfer is provided for in the standard, generally by way of the MAC layer which utilizes a CSMA/CA (Carrier Sense Multiple Access with Collision Avoidance) communication scheme.

The IEEE 802.11 standard provides for a Time-Division Duplexing (TDD) having Carrier-Sense, Multiple-Access and Collision Avoidance (CSMA/CA). Proposals have been set forth to also provide for SDMA (Space-Division, Multiple-Access) communications in the existing scheme.

By providing for a SDMA communication scheme, the communication capacity of the WLAN would be significantly increased. Analogously, in other communication systems, providing for SDMA communications would similarly also significantly increase the communication capacity of such a communication system.

The communication scheme defined in the IEEE 802.11 standard, however, provides for packet communications in which packet sizes are variably sized, depending, for instance, upon the amount of data to be communicated pursuant to a communication session. The communication scheme also provides for a receiving station which receives data packets to acknowledge their receipt.

When only a single communication session is effectuated within a single time slot of the TDD scheme, a conventional packet data send-acknowledgment scheme works without difficulty. However, when two or more data packets are communicated simultaneously during a single time slot of the TDD scheme, detection of multiple acknowledgments, indicating successful transmission of data packets pursuant to more than one communication session, become problematical. A sending station, e.g., sending data packets pursuant to two or more communication sessions simultaneously, is unable to detect an acknowledgment returned by a receiving station pursuant to one communication session if the sending station is still sending data pursuant to another communication session. Because of the potentially unequal sizes of the data packets to be communicated pursuant to the separate communication sessions, acknowledgments are likely unable to be detected as required pursuant to the communication scheme.

A manner by which to ensure that the acknowledgments to acknowledge reception of data packets communicated pursuant to separate communication sessions is necessary to permit proper operation of a packet data communication system. If a manner could be provided by which to ensure that the acknowledgments are successfully received, use of SDMA in a packet communication system, such as a WLAN operable pursuant to the IEEE 802.11 standard, would be workable.

It is in light of this background information related to packet communication systems that the significant improvements of the present invention have evolved.

SUMMARY OF THE INVENTION

The present invention, accordingly, advantageously provides apparatus, and an associated method, by which to communicate data in a packet communication system, such as a WLAN (Wireless Local Area Network), constructed pursuant to the IEEE 802.11 standard.

Through operation of an embodiment of the present invention, variably-sized data packets are communicated pursuant to a SDMA (Space-Division, Multiple-Access) scheme. By providing a workable SDMA scheme, the communication capacity of the packet communication system is significantly increased as communications pursuant to more than one communication session are simultaneously effectuable.

In one aspect of the present invention, determination is made of the lengths of the data packets to be communicated pursuant to separate communication sessions which are to be effectuated during a common time period, such as a time slot, in the SDMA communication scheme. The determination is at least a relative determination of the relative lengths of the data to be communicated pursuant to the separate communication sessions. Data which is of a lesser length than a longest-length data transmission is thereby determined. Responsive to such determination, such data is padded with additional data so that the data lengths of the data to be communicated pursuant to the separate communication sessions are all of the same length. The padded data, in one implementation, is merely dummy data, not to be utilized by the receiving station which receives the data. In another implementation, the padded data includes, or pertains to, error correcting code which is used for error correction purposes. By sending data all of the same lengths, the sending station, such as an access point in a WLAN, is thereby able to complete transmission of the data, or a portion thereof, and thereafter detect acknowledgments generated responsive thereto. Because transmission of the data pursuant to the separate communication sessions ends at substantially the same time, the possibility that an acknowledgment shall fail to be detected is reduced.

In another implementation, "null padding" is utilized, and operation is analogous to a delayed-ACK scheme. In a delayed-ACK scheme, the recipient of a data packet is commanded to wait for a specified time period, subsequent to reception of the pocket, and prior to the transmission of an ACK indication.

In contrast to dummy-data padding, null padding reduces intra-SDMA interference. In downlink SDMA communications, the transmit power is focused on the not-padded portion of the burst. Essential for null-padded SDMA operation is how a mobile terminal reacts to the vanishing of the received signal strength during the padded portion. The length of a packet can also be tuned with modulation such that selecting a lower-datarate modulation results in a longer packet and vice versa. This can help to reduce the amount of padding if a lower-datarate modulation is selected for the shorter of the simultaneously transmitted packets.

In another aspect of the present invention, in addition to padding of one or more data sequences to be communicated pursuant to a communication session, the data to be communicated pursuant to the separate communication sessions is divided into data fragments. First data fragments are communicated pursuant to the separate communication sessions for a selected time period. The data fragments are all of substantially the same length when transmission of the fragments is completed, transmission ends for a period to permit the receiving stations to acknowledge reception of the data fragments. Thereafter, additional data fragments are communicated in like manner. By dividing data into data fragments, lesser amounts of padding need to be applied to data streams other than the longest of the data streams. Additional overhead is introduced, however, as additional acknowledgments, and their corresponding overhead, are generated.

In another aspect of the present invention, a manner is provided by which to dynamically fragment the data communicated pursuant to the separate communication sessions. In one implementation, a fragment length is initially selected to be of a defined length. Subsequent fragment lengths are determined according a shortest remaining amount of data to be communicated pursuant to one of the communication sessions. Thereby, padding of data on one or more of the data streams is not required. However, again, by defining fragments to be of short durations, increased overhead due to the acknowledgments, and their associated overhead, is required.

In one implementation, a manner is provided by which to permit SDMA (Space-Division, Multiple-Access) operation of a WLAN operable pursuant to the IEEE 802.11 standard. Determinations are made of data sizes of data to be communicated pursuant to more than one communication session upon a single channel, such as a single time slot of a TDD (Time Division Duplex) scheme. Responsive to the determinations, the data communicated pursuant to each of the communication sessions is caused to end, at least for selected time periods, at common time periods. Subsequent to the ending of the data communication, acknowledgments are returned to the sending station. Thereby, the sending station is able to detect the acknowledgments acknowledging receipt at respective receiving stations of the data communicated pursuant to the separate communication sessions. The data communicated pursuant to the separate communication sessions are caused to be of equal lengths either by adding, i.e., padding, data to one or more of the data streams or by defining data fragments into which the data streams are divided.

In these and other aspects, therefore, apparatus, and an associated method, is provided for a multi-user, packet communication system. The system at least permits packet data of selected data sizes to be communicated by a network communication station to a first remote station pursuant to a first communication session. And, packet data of selected data sizes is further permitted to be communicated by the network communication station to at least a second remote communication station pursuant to at least a second communication session. Concurrent communications during a selected time period pursuant to the first and the at least second communication sessions is facilitated. A determiner is coupled to receive indications of the selected data sizes of the data to be communicated during the first and at least second communication sessions. The determiner determines at least relative sizes of the data to be communicated pursuant to each of the first and at least second communication sessions. A packet data transmitter is operable to transmit concurrently and for a selected time period data pursuant to the first communication session and data pursuant to the second communication session. The selected time period is selected responsive to determinations made by the determiner.

A more complete appreciation of the present invention and the scope thereof can be obtained from the accompanying drawings which are briefly summarized below, the following detailed description of the presently-preferred embodiment of the invention, and the appended claims.

DETAILED DESCRIPTION OF THE PREFERRED EMBODIMENT

Figure 1:
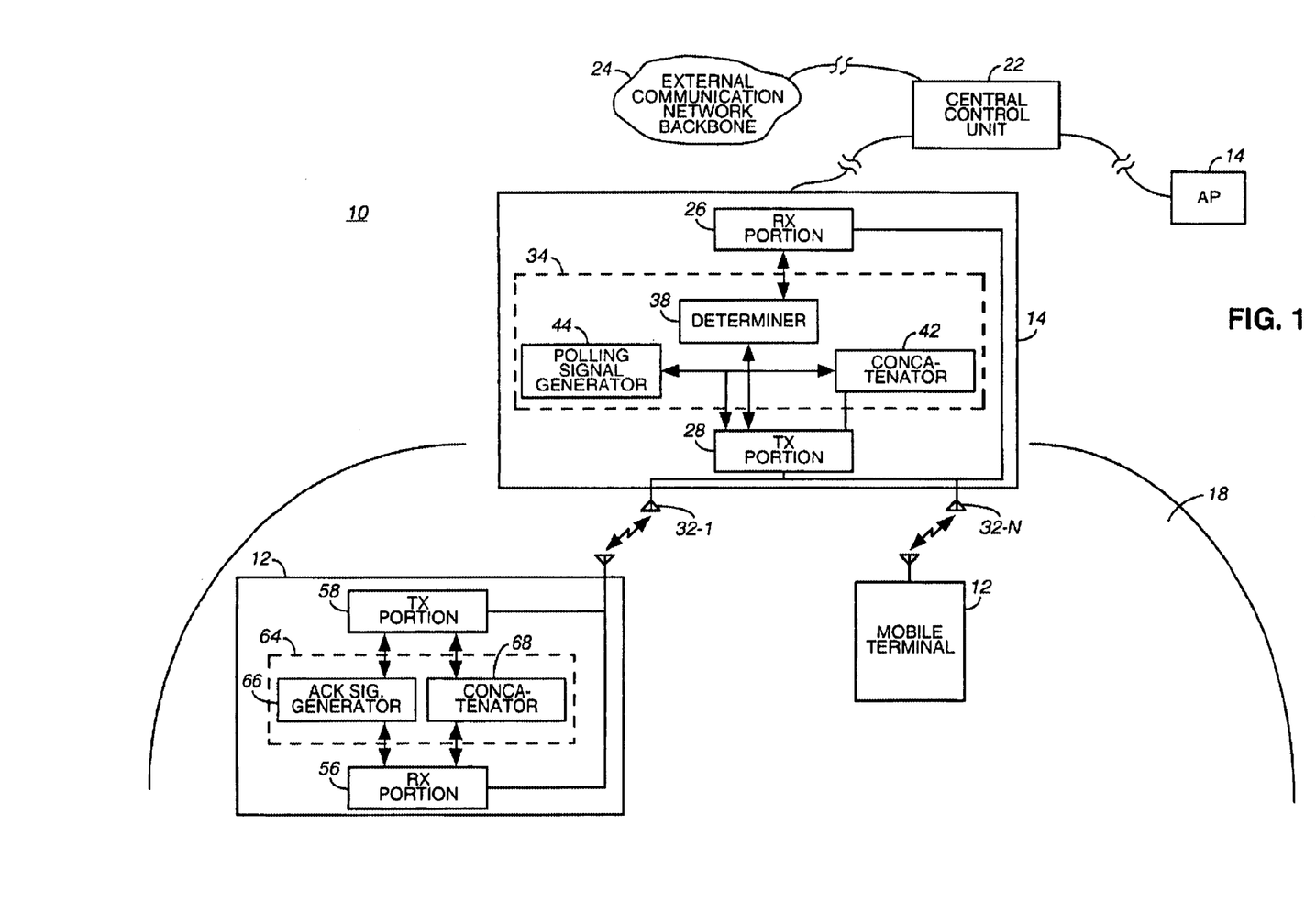
FIG. 1 illustrates a functional block diagram of a communication system in which an embodiment of the present invention is operable.

Referring first to FIG. 1, a communication system, shown generally at 10, provides for radio communications with mobile terminals, of which the mobile terminal 12 is exemplary, therein. In the exemplary implementation, the communication system 10 forms a WLAN (Wireless Local Area Network) which provides for radio communications with the mobile terminal as set forth in the IEEE 802.11 standard as well, potentially, pursuant to a proprietary mode of operation. Other communication systems can analogously be represented, and operation of an embodiment of the present invention is analogously also operable in such other communication systems.

In conventional manner, the WLAN includes a plurality of spaced-apart Access Points (APs) 14 positioned at spaced-apart locations. Two access points are shown in the Figure. In an actual WLAN, typically, in greater numbers of access points 14 are utilized. The access points 14 are sometimes referred to as base stations or RADs (Remote Antenna Devices). The term "access point" shall generally be used herein to identify such devices as the devices form the points of access to the network infrastructure of the communication system.

The access points 14 include radio transceiver circuitry capable of transceiving radio communication signals with mobile terminals when the mobile terminals are positioned within communication range of the access points. Generally, a mobile terminal communicates with an access point 14 when the mobile terminal is positioned within all area, referred to as a cell 18, proximate to, and defined by, the access point. The Figure illustrates a cell 18 associated with each of the illustrated access points.

The access points 14 are here shown to be coupled to a Central Control Unit (CCU) 22. The CCU 22 provides control functions to control various aspects of operation of the WLAN. And, as shown, the CCU 22 provides for connections to an external communication network backbone 24. Although not separately shown, other communication devices, such as other communication stations and other communication networks are typically coupled to the communication network backbone 24. Thereby, a communication path can be formed to provide for communications between the mobile terminal 12 and communication stations coupled, either directly or indirectly, to the communication network backbone. Also, local communications between mobile terminals 12 are also permitted. In communications between pairs of mobile terminals, the communication path formed therebetween includes two separate radio-links.

The access point 14 is operable pursuant to an embodiment of the present invention to permit SDMA (Space-Division, Multiple-Access) operation to communicate concurrently, pursuant to separate communication sessions, with more than one mobile terminal 12. In the exemplary implementation in which the communication system 10 is operable pursuant to a TDD (Time-Division Duplexing) scheme, data is communicated pursuant to the separate communication sessions during a single time slot. By permitting the multiple communication sessions, the communication capacity of the communication system is thereby increased.

The transceiver circuitry of the access point 14 is here represented by a receiver portion 26 and a transmitter portion 28. The receiver and transmitter portions are each operable to communicate packet data. That is to say, the receiver portion 26 is operable to receive data packets, and the transmitter portion is operable to transmit data packets. Pursuant to SDMA operation of the system, more than one antenna transducer, here antenna transducers 32-1 and 32-N, are coupled to the portions 26 and 28. During operation of the transmitter portion, for instance, data to be transmitted pursuant to the separate communication sessions are provided to separate ones of the antenna transducers 32 to be transduced therefrom. And, signals detected by the respective ones of the antenna transducers 32 are provided to the receiver portion 26 to be acted on thereat.

Portions of an embodiment of the present invention are embodied at a control element 34, here, for example, a processing device having algorithms executable thereat. The elements of the control element are functionally represented and are implemented, for instance, by algorithms which are executable at the control element. The illustrated elements include a determiner 38, a concatenator 42, and a polling signal generator 44.

The determiner 38 is coupled to the transmitter portion 28 and is operable to determine at least relative lengths of data which is to be transmitted pursuant to each of the separate, concurrent communication sessions. In one embodiment, indications of the results of the determination are provided to the concatenator 42. The concatenator is operable in one embodiment of the present invention to concatenate data, i.e., pad data, to data of a shorter length than a longest of the data determined by the determiner. By concatenating or padding shorter data segments with the additional data, all of the data segments communicated during a selected time period are caused to be of the same length. The data is communicated pursuant to the separate communication sessions to separate ones of the mobile terminals 12.

In another embodiment, the concatenator 42 is not utilized. Instead, determinations made by the determiner are provided to the transmitter and lengths of data fragments into which the data segments are divided. The data fragments communicated pursuant to the separate communication sessions are of corresponding lengths, as shall be described below, in the exemplary implementation of this embodiment of the present invention.

The polling signal generator 44 is also coupled to receive indications of determinations made by the determiner 38. The polling signal generator generates polling signals which are caused to be transmitted by the transmitter portion to the mobile terminals 12 to indicate to the mobile terminals permissible data sizes of data to be communicated by the mobile terminals to the access point.

In the exemplary communication system 10, two-way communications are effectuated between the access point and a mobile terminal. Each mobile terminal also, therefore, includes transceiver circuitry, here formed of a receiver portion 56 and a transmitter portion 58. The mobile terminal also has a control element 64 having functional portions including an acknowledgment signal generator 66 and, in an exemplary implementation, also a concatenator 68. The acknowledgment generator 66 is operable to generate acknowledgment indications to be returned to the access points to acknowledge reception at the mobile terminal of data transmitted thereto. And, the concatenator 68 is operable to pad a data segment with data according to the indications of a polling signal previously transmitted to the mobile terminal. Appropriate padding of data segments ensures that the data lengths of the data communicated by all of the mobile terminals during a selected time period are of the same length.

Figure 2:
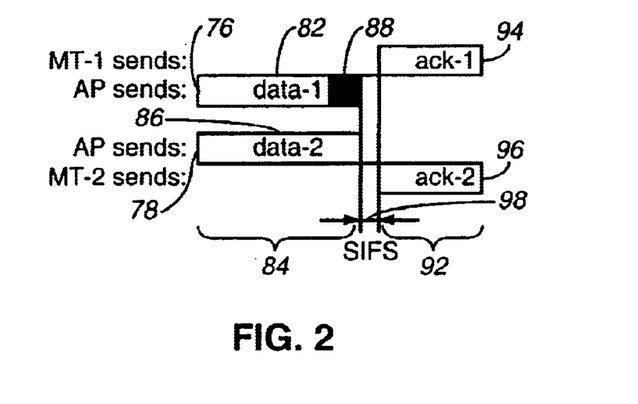
FIG. 2 illustrates a representation of SDMA (Space-Division, Multiple-Access) communications pursuant to two separate communication sessions according to an embodiment of the present invention.

FIG. 2 illustrates exemplary data communication of data pursuant to two separate communication sessions in the communication system shown in FIG. 1. Data communicated pursuant to a first communication session 76 is indicated at the top (as shown) portion of the figure, and data communicated pursuant to a second communication session 78 is shown at the bottom (as shown) portion of the illustration. A first data packet 82 is communicated by the access point to a mobile terminal during a first time period 84. Also during the first time period 84, a data packet 86 is communicated by the access point to a second mobile terminal. The data packet 82 is of a smaller size than the data packet 86. Pursuant to an embodiment of the present invention, the concatenator 42 pads the data packet 82 with additional data, here data 88, thereby to cause the data communicated pursuant to the first communication session 76 to correspond in length to the data communicated pursuant to the second communication session 78. The data packets are received at the respective mobile terminals at substantially the same time, here indicated at 92. Acknowledgments which acknowledge the reception at the respective mobile terminals of the data packets 82 and 86 are returned to the access point. Such acknowledgments are indicated at 94 and 96, respectively. In one implementation, the data 88 is merely dummy data which is not used for any purpose other than to concatenate data to the data packet 82. In another implementation, null data (no transmission) is used, referred to here as null padding. In another implementation, the data 88 forms here a correcting code used for error correction purposes at a MAC level. The error correcting code comprises, selectably, check sums for partial, or even complete, repetition of the payload data 82. The mobile terminals which receive the data 82–88 and 86 must also be made aware of the packet length of the data. In the first communication session, the mobile terminal must be made aware of the data length of the packet 82 as well as the length of the padded portion 88. Thereby, the mobile terminal is able to separate the padded portion of the data received from the padded data. In the delayed-ACK interpretation of null padding, the mobile terminal has to know of the length of the wait-before-ACK period which is the same as the length of the padded portion. The illustration of the figure represents communication of data during a Contention Free Period (CFP) of operation. The illustration also indicates an SIFS (Short Inter Frame Space) 98 during which data is not communicated on a downlink or an uplink channel.

FIG. 2 represents downlink communications from the access point to the mobile terminals. The same scenario, however, is applicable to uplink communications. Viz, mobile terminals send the data packets and the access point sends ACKs.

FIG. 3 illustrates again the data packets 82 and 86 together with the padded portion 88. The illustration further shows an inter fragment boundary, 102 defined in the IEEE 802.11 standard used pursuant to an embodiment of the present invention. As illustrated, the segment 82 is divided into a first fragment 82-1 prior to the inter fragment boundary and a second fragment 82-2 subsequent to the boundary 102. Analogously, the data packet 86 is divided into a first fragment 86-1 and a second fragment 86-2 to which the padded portion 88 is again shown to be concatenated.

Figure 3:
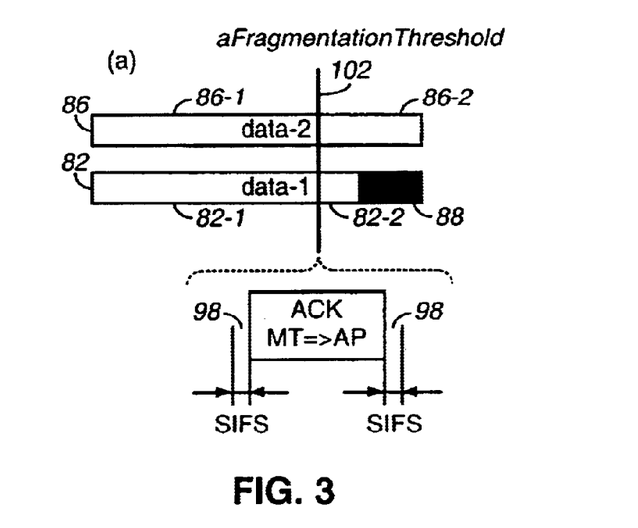
FIG. 3 illustrates a representation, similar to that shown in FIG. 2, but of another exemplary communication pursuant to an embodiment of the present invention.

The enlarged portion of the figure indicates that between the transmission of consecutive fragments, acknowledgment indications are generated by a receiving station, here the mobile terminals, to acknowledge receipt of the data fragments 82-1 and 86-1. The corresponding SIFS periods 98 are also indicated.

FIG. 4 again illustrates the data packets 82 and 86 generated during a communication session. Again, the packet 82 is divided into fragments including the aforementioned first and second fragments 82-1 and 82-2. And, the data packet 86 is divided into the data fragments 86-1 and 86-2. Also, the padded portion 88 is again shown. Here, two inter fragment boundaries are indicated. The data packet 82 is also shown to be of a length to extend into a third period to form also a third data fragment 82-3.

Figure 4:
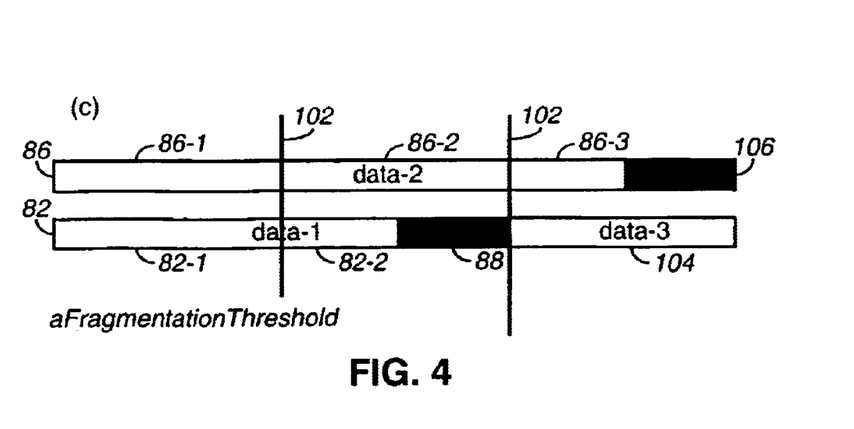
FIG. 4 illustrates a representation, similar to those shown in FIGS. 2 and 3, but here of additional communication effectuated pursuant to an embodiment of the present invention.

Subsequent to the second inter fragment boundary, a data packet pursuant to another communication session, here indicated at 104, is generated as the data packet 86, together with the padded portion 88, is completed. Here, though, because the segment 104 extends beyond the fragment 82-3, a padded portion 106 is concatenated to the segment 82-3.

Thereby, again, the fragments of the different simultaneous, user-specific transmissions are caused to be of equal lengths. By dividing the packets into fragments, only the final fragments, here fragments 86-2 and 82-3 require padding. And, while the fragment lengths during successive fragment periods are shown to be of equal lengths, such lengths can, alternately, be different.

Through operation of an embodiment of the present invention, therefore, new frame-types should be defined in the IEEE 802.11 standard, or variant thereof, to permit SDMA operation of the system. The table below indicates various of the new frame-types.

| | Type value b3 b2 | Type description | Subtype value b7 b6 b5 b4 | Subtype description | Usage |
|---|---|---|---|---|---|
| 1 | 10 | Data | 1000 | Padded-Data | In UL SDMA and DL SDMA |
| 2 | 10 | Data | 1001 | Padded-Data + CF-Ack | In UL SDMA (also in DL SDMA but only if Data and CF-Ack are to the same MT) |
| 3 | 19 | Data | 1010 | Padded-Data + CF-Pull | In DL SDMA prior to normal single-user smart-antenna operation of UL |
| 4 | 10 | Data | 1011 | Padded-Data + CF-Pull-Length-Set | in DL SDMA prior to UL SDMA |
| 5 | 10 | Data | 1100 | CF-Poll-Length-Set | Prior to UL SDMA |
| 6 | 10 | Data | 1101 | Padded-Data + CF-Poll-Length-Set ACK | As 1010 when ACK is for the same user as padded-data and CF-Poll-Length-Set |

-continued

| Type value b3 b2 | Type description | Subtype value b7 b6 b5 b4 | Subtype description | Usage |
|---|---|---|---|---|
| 7  10 | Data | 1110 | Padded-Data + CF-Poll-Length-Set + ACK | As 1011 when ACK is for the same user as Padded-Data and CF-Poll-Length-Set |
| 8  10 | Data | 1111 | CF-Poll-Length_Set + ACK | As 11100 when ACK is for the same user as CF-Poll-Length-Set |

In addition, additional modifications to the usage of the duration/ID field and the first bytes of the frame body are made. The first four frames noted in the table have a duration/ID field which carries the length of the actual payload without padding. In the fourth and seventh frame indicated in the table, the first two bytes of the frame body carry the required length of the polled MPDU (Management Protocol Packet Data Unit). The polled mobile terminal pads, and/or fragments, the data packet that is transmitted therefrom to this length. And, in the fifth and eighth frame noted in the table, the duration/ID field carries the required length of the polled MPDU, the length after padding or length of fragments, to which the length of the polled mobile terminal pads, and/or fragments, the data packet that is transmitted therefrom. Additionally, it should be noted that a special case exists if the length of the actual payload, without padding, equals the MPDU length, after padding, no padding is used. Additionally, if the length of the actual payload, without padding, in the duration/ID field of the fourth frame noted in the table merely covers the bytes required to set the length of the polled MPDU, the length after padding or length of fragments, the rest of the payload is dummy data. The access point utilizes such a frame in order to simultaneously poll several mobile terminals for uplink SDMA when the access point has downlink data to be sent to some of the mobile terminals, but not to all, during the associated downlink SDMA period.

In another embodiment, padding data packets with dummy, or other data, is obviated. Instead, dynamic fragmenting is implemented responsive to determinations by the determiner 38 (shown in FIG. 1). Generally, for each Dynamic Length (DL)-SDMA frame to be transmitted by the access point, the remaining length of the shortest of the simultaneously-transmitted packets defines a length, referred to as fragment length, with which all the simultaneous transmissions are fragmented.

When the shortest packet is completely transmitted, the fragment length is defined by the shortest of the then-remaining simultaneous transmissions. Also, a new data packet which is to be transmitted can be taken in place of a completed transmission such that the number of simultaneously-served mobile terminals remains constant. The maximum value of fragment length equals a threshold value (a fragmentation threshold parameter in the IEEE 802.11 standard). When a minimum length, i.e., the length of the shortest of the simultaneously-transmitted packets, is less than the fragmentation threshold, the fragment length is preferably set to equal the minimum length in order to minimize the number of fragments.

When the minimum length is greater than the fragmentation threshold, several choices are available to define the fragment length.

Figure 5:
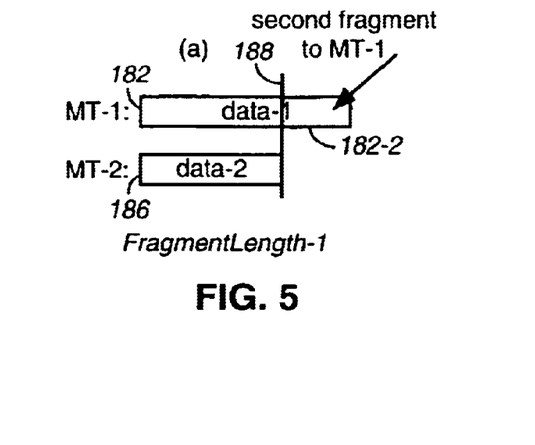
FIG. 5 illustrates a representation of communication pursuant to another set of communication sessions during operation of another embodiment of the present invention.

FIG. 5 illustrates data packets 182 and 186 to be communicated concurrently pursuant to separate communication sessions during a common time period. Here, an inter fragment boundary 188 is formed at the end of the shortest of the data packets, here the data packet 186. A fragment portion 182-2 extends beyond the inter fragment boundary 188.

FIG. 6 illustrates again the data packets 182 and 186 again communicated concurrently pursuant to separate communication sessions. Here, the minimum length of the data packets 182 and 186 arc greater than the fragmentation threshold. The fragment length is here equal to the minimum length divided by A where A is the smallest positive integer number for which the fragment length equals the minimum length divided by A and is also less than the fragmentation threshold. As a result, A fragments are required to complete the shortest transmission before which, at an inter fragment boundary, the fragment length does not necessarily have to be adjusted.

FIG. 7 again illustrates the data packets 182 and 186 communicated pursuant to separate communication sessions. Here, the fragment length is set to equal the fragmentation threshold for the first fragments, here fragments 182-1 and 186-1. The subsequent fragment length is defined as noted with respect to that shown in FIG. 5. That is to say, the fragment length is defined according to shortest remaining fragment. Here, the fragment 186-2 is of the shortest length. So, the subsequent inter fragment boundary 188 is defined to occur therefrom.

Figure 6:
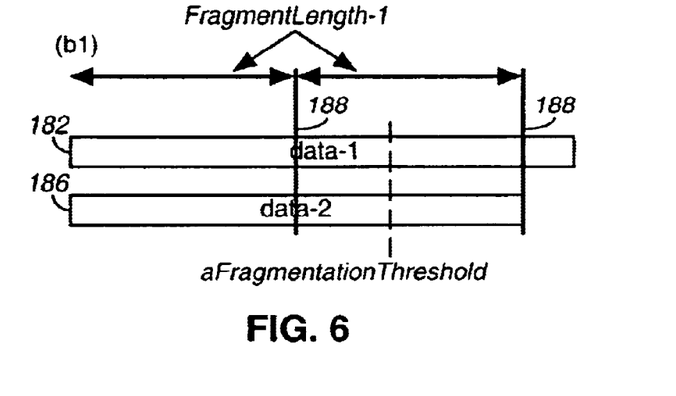
FIG. 6 illustrates another representation of communication pursuant to operation of an embodiment of the present invention, similar to that shown in FIG. 5.
Figure 7:
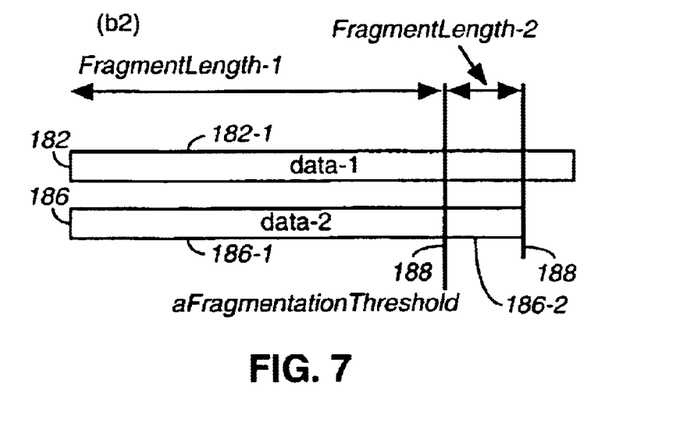
FIG. 7 illustrates a representation, similar to those shown in FIGS. 5 and 6, but here representing additional communications pursuant to an embodiment of the present invention.

Analysis of the embodiment represented by the illustrates of FIGS. 5–7 indicates that dynamic fragmenting without padding can result in the existence of short fragments when the lengths of different, simultaneously-transmitted, user-specific packets are close to each other but not exactly equal. This can introduce, in some instances, excessive levels of overhead through the need to acknowledge receipt of the data fragments. Conversely, if the separate packets are of substantially differing lengths, dynamic fragmenting would appear to be a preferable alternative.

In DL SDMA, AP could, in principle, delay the beginning of the shorter simultaneous packets such that the packets end at the same time with the longest packet. However, at this time, it is not clear to us whether or not this would strongly violate the current IEEE 802.11 standard. On the other hand, in other similar systems delaying might well be the best solution.

In UL SDMA, AP could, in principle, ask the mobile terminals in advance the lengths of the next data packets that these mobile terminals are going to transmit when polled. AP could then set the longest of the simultaneous packets to be the required packet length. Thus, no extra fragmenting would be needed. However, asking the packet lengths would cause extra signaling and overhead.

Figure 8:
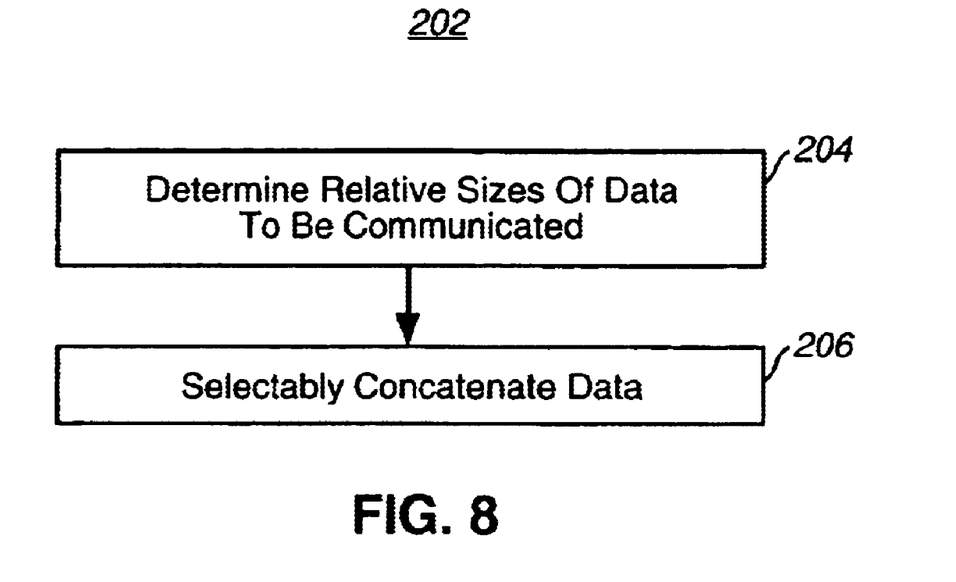
FIG. 8 illustrates a method flow diagram listing the method of operation of an embodiment of the present invention.

FIG. 8 illustrates a method, shown generally at 202, of an embodiment of the present invention. The method is operable to facilitate concurrent communications during a selected time period pursuant to a first and at least second communication session. First, and as indicated by the block 204, the relative sizes of data to be communicated pursuant to each of the communication sessions is determined. Then, and as indicated by the block 206, responsive to the determinations, additional data is selectably concatenated to at least one of the data to be communicated during the selected time period.

Thereby, through operation of an embodiment of the present invention, a manner is provided by which to provide SDMA (Space-Division, Multiple-Access) communications to a communication scheme in which variably-sized data packets are to be communicated concurrently pursuant to separate communication sessions.

The previous descriptions are of preferred examples for implementing the invention, and the scope of the invention should not necessarily be limited by this description. The scope of the present invention is defined by the following claims.

I claim:

1. In a multi-user, packet communication system at least permitting packet data of selected data sizes to be communicated by a network communication station to a first remote station pursuant to a first communication session and by the network communication station to at least a second remote communication station pursuant to at least a second communication session, an improvement of apparatus for facilitating concurrent communications during a selected time period pursuant to the first and the at least second communication session, respectively, said apparatus comprising:

a determiner coupled to receive indications of the selected data sizes of the data to be communicated, respectively, during the first and at least second communication sessions, said determiner for determining at least relative sizes of the data to be communicated pursuant to each of the first and at least second communication sessions, and a packet data transmitter operable to transmit concurrently and for the selected time period, data pursuant to the first communication session and data pursuant to the second communication session, the selected time period selected responsive to determinations made by said determiner.

2. The apparatus of claim 1 the selected time period during which said packet data transmitter concurrently transmits the data pursuant to the first and at least second communication sessions, respectively, corresponds to the data size of the smallest of the data communicated pursuant to the first communication session and the data communicated pursuant to the at least the second communication session.

3. The apparatus of claim 1 further comprising a concatenator coupled to said determiner, said concatenator for concatenating additional data to be communicated during the selected time period pursuant to at least one of the first and at least second communication sessions, the additional data concatenated in a manner such that the data to be communicated during the selected time period pursuant to all of the first and at least second communication sessions are of equal sizes.

4. The apparatus of claim 3 wherein the additional data concatenated by said concatenator comprises padding data.

5. The apparatus of claim 4 further comprising a polling signal generator coupled to said determiner, said polling signal generator for generating a polling signal for communication to the first and at least second remote stations, respectively, the polling signal of values indicative of the at least relative size of largest-sized data of the data to be communicated pursuant to the first and at least second communication sessions.

6. The apparatus of claim 5 wherein the first and at least second remote stations are further operable to communicate data, pursuant to the first and at least second communication stations, respectively, and wherein the values of the polling signal are indicative of allowable data sizes to be communicated by the first and at least second remote stations, respectively, to the network station.

7. The apparatus of claim 6 wherein said concatenator includes a network portion and a remote station portion, wherein data originated at the network station is communicated upon downlink channels to the remote station and data originated at the remote stations is communicated upon uplink channels to the network station, said network portion of said concatenator for concatenating the additional data to data to be communicated upon the downlink channels and said remote station portion for concatenating the additional data to data to be communicated upon the unlink channels.

8. The apparatus of claim 7 further comprising an acknowledgment indication generator coupled to receive indications of receipt at the network station of the data communicated upon the uplink channels, said acknowledgment indication generator for indicating to the first and at least second remote stations receipt at the network station of the data communicated thereto.

9. The apparatus of claim 4 wherein the multi-user, packet communication system comprises a WLAN (Wireless Local Area Network), wherein the network station comprises an access point operable in the WLAN, and wherein said determiner and said concatenator are coupled to the access point.

10. In the WLAN of claim 9, a further improvement of operating the access point, and the WLAN of which the access point forms a portion, in a SDMA (Space-Division, Multiple-Access) mode.

11. The apparatus of claim 3 wherein the first remote station and the at least the second remote station each acknowledge reception thereat of the data communicated thereto pursuant to the first communication session and the second communication session, respectively, acknowledgments returned by each of the first and at least second remote stations generated during a common time interval.

12. The apparatus of claim 11 wherein the common time interval is repeated at selected acknowledgment intervals.

13. The apparatus of claim 12 wherein the acknowledgment intervals are of sizes less than the data size of the largest of the data communicated pursuant to the first communication session and the data communicated pursuant to the at least the second communication session.

14. The apparatus of claim 13 wherein an initial portion of the data communicated pursuant to each of the first and at least second communication sessions is communicated prior to the common time interval and an additional portion of the data is communicated subsequent to the common time interval.

15. In a multi-user, packet communication system at least permitting packet data of selected data sizes to be communicated by a network communication station to a first remote station pursuant to a first communication session and by the network communication station to at least a second remote communication station pursuant to at least a second communication session, an improvement of apparatus for facilitating concurrent communications during a selected time period pursuant to the first and the at least second communication sessions, respectively, said apparatus comprising:

a determiner coupled to receive indications of the selected data sizes of the data to be communicated, respectively, during the first and at least second communication sessions, said determiner for determining at least relative sizes of the data to be communicated pursuant to each of the first and at least second communication sessions; and a concatenator coupled to said determiner, said concatenator for concatenating additional data to the data to be communicated pursuant to at least one of the first and at least second communication sessions, the additional data concatenated in a manner such that the data to be communicated during the selected time period pursuant to all of the first and at least second communication sessions are of equal sizes.

16. In a method for communicating in a multi-user, packet communication system at least permitting packet data of selected data sizes to be communicated by a network communication station to a first remote station pursuant to a first communication session and by the network communication station to at least a second remote communication station pursuant to at least a second communication session, an improvement of a method for facilitating concurrent communications during a selected time period pursuant to the first and the at least second communication sessions, respectively, said method comprising:

determining at least relative sizes of the data to be communicated pursuant to each of the first and at least second communication sessions; and selectably concatenating, responsive to determinations made during said operation of determining, additional data to be communicated pursuant to at least one of the first and at least second communication sessions, the additional data to be communicated during the selected time period pursuant to all of the first and at least second communication sessions are of equal sizes.

17. The method of claim 16 wherein the additional data concatenated during said operation of selectably concatenating comprises padding data.

18. The method of claim 16 comprising the additional operations at the first and at least second remote stations of acknowledging reception of the data communicated thereto, acknowledgments generated by each of the first and at least second remote stations returned to the network during a common time interval.

19. The method of claim 18 wherein the common time interval is repeated at selected acknowledgment intervals.

20. The method of claim 19 wherein the acknowledgment intervals are of sizes less than the data size of the largest of the data communicated pursuant to the first communication session and the data communicated pursuant to the at least the second communication session.

21. The method of claim 20 wherein an initial portion of the data communicated pursuant to each of the first and at least second communication sessions is communicated prior to the common time interval and an additional portion of the data is communicated subsequent to the common time interval.

22. The method of claim 21 further comprising the operation of generating a polling signal for communication to the first and at least second remote stations, the polling signal of values indicative of largest-sized data of the data to be communicated pursuant to the first and at least second communication sessions.

* * * * *